United States Patent
Iwasa et al.

(10) Patent No.: US 12,039,377 B2
(45) Date of Patent: Jul. 16, 2024

(54) LOAD LEVELING DEVICE, LOAD LEVELING METHOD, AND LOAD LEVELING PROGRAM

(71) Applicant: Nippon Telegraph and Telephone Corporation, Tokyo (JP)

(72) Inventors: Eriko Iwasa, Tokyo (JP); Makoto Hamada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 636 days.

(21) Appl. No.: 17/288,080

(22) PCT Filed: Oct. 29, 2019

(86) PCT No.: PCT/JP2019/042265
§ 371 (c)(1),
(2) Date: Apr. 23, 2021

(87) PCT Pub. No.: WO2020/090777
PCT Pub. Date: May 7, 2020

(65) Prior Publication Data
US 2021/0373968 A1    Dec. 2, 2021

(30) Foreign Application Priority Data

Nov. 2, 2018  (JP) ................................. 2018-207710

(51) Int. Cl.
*G06F 9/50*   (2006.01)
*G06F 9/455*  (2018.01)

(52) U.S. Cl.
CPC ........ *G06F 9/5083* (2013.01); *G06F 9/45558* (2013.01); *G06F 9/505* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2008/0104608 A1* | 5/2008 | Hyser | ................... | G06F 9/5088 718/105 |
| 2020/0042340 A1* | 2/2020 | Wiggers | ................ | G06F 9/5077 |
| 2020/0351254 A1* | 11/2020 | Xiong | ................. | H04L 12/4633 |

OTHER PUBLICATIONS

Blogs.vmware.com, [online], "VSphere Basics to Keep in Mind-Availability vSphere DRS," Feb. 3, 2014, retrieved on Oct. 3, 2018, retrieved from URL<https://blogs.vmware.com/jp-cim/2014/02/vspheredrs.html>, 13 pages (with English Translation).

(Continued)

*Primary Examiner* — Qing Yuan Wu
(74) *Attorney, Agent, or Firm* — Fish & Richardson P.C.

(57) ABSTRACT

Load leveling between hosts (computes) is realized in a virtual infrastructure regardless of application restrictions on the virtualization technique and by reducing the influence on services. A load leveling apparatus 10 includes: a load determination unit 112 that acquires load information for a compute 30 of each VM 3, calculates a load of each compute 30 by totaling the load information for every compute 30 in which the VMs are disposed, calculates a standard deviation of the load of each compute 30, and, in a case where the calculated standard deviation is larger than a predetermined reference standard deviation, determines that there is a large load bias; a VM disposition determination unit 113 that extracts the compute 30 having the highest load among the loads of the computes 30, selects a VM 3 disposed in the compute 30, specifies a VM 3 forming a pair with selected VM 3, and determines the pair of VMs 3 as a pair of VMs for switching; and a switching instruction unit 114 that outputs instruction information for switching the determined pair of VMs.

9 Claims, 8 Drawing Sheets

(56) References Cited

OTHER PUBLICATIONS

Docs.openstack.org, [online], "R-IOV," Jan. 26, 2018, retrieved on Oct. 3, 2018, retrieved from URL<https://docs.openstack.org/newton/networking-guide/config-sriov.html>, 10 pages.
Wiki.openstack.org, [online], "Watcher," 2017, retrieved on Oct. 3, 2018, retrieved from URL<https://wiki.openstack.org/wiki/Watcher>, 4 pages.

* cited by examiner

Fig. 3

| HW Id | MULTIPLEXING RATE | USAGE RATE | ALLOCATION DESTINATION |
|---|---|---|---|
| #0 | 100% | 50% | VM#1, VM#2 |
| #1 | 100% | 70% | VM#3, VM#10, VM#22 |
| #2 | 150% | 20% | VM#4, VM#33 |
| #3 | 150% | 50% | VM#11, VM#44 |
| ⋮ | ⋮ | ⋮ | ⋮ |

210 RESOURCE MANAGEMENT TABLE

Fig. 4

110 REDUNDANT CONFIGURATION MANAGEMENT TABLE

| App | App ID | VM ID | Virtual IP |
|---|---|---|---|
| VNF1 | #01 | #1, #11 | 192.168.xx.xx |
| VNF2 | #02 | #3, #33 | 192.168.xx.xx |
| ⋮ | ⋮ | ⋮ | ⋮ |
| VNF10 | #010 | #2, #22 | 192.168.xx.xx |

LOAD LEVELING DEVICE, LOAD LEVELING METHOD, AND LOAD LEVELING PROGRAM

CROSS-REFERENCE TO RELATED APPLICATIONS

This application is a National Stage application under 35 U.S.C. § 371 of International Application No. PCT/JP2019/042265, having an International Filing Date of Oct. 29, 2019, which claims priority to Japanese Application Serial No. 2018-207710, filed on Nov. 2, 2018. The disclosure of the prior application is considered part of the disclosure of this application, and is incorporated in its entirety into this application.

TECHNICAL FIELD

The present invention relates to a load leveling apparatus, a load leveling method and a load leveling program that utilize switching between VMs (Virtual Machines) in a virtual infrastructure.

BACKGROUND ART

In recent years, in communication services, there is increasing adoption of virtualization of network functions (NFV: Network Functions Virtualization) that applies virtualization technology. Network virtualization is configured such that network functions that are conventionally realized using dedicated hardware are created as software and operated on a general-purpose server. By applying network functions virtualization technology to a carrier network, it is expected to be able to economically achieve both scalability and reliability, to provide quick service, to realize flexible allocation of resources according to demand on a service-by-service basis, and to realize service expansion that is not constrained by the lifespan of hardware.

A system that abstracts and conceals physical resources such as servers and networks using this virtualization technology and provides a common infrastructure to a plurality of applications or services is called a virtual infrastructure.

VMware vSphere ("VMware vSphere" is a registered trademark) and OpenStack ("OpenStack" is a registered trademark) are known examples of technology for realizing a virtual infrastructure.

VMware vSphere is one type of existing virtual infrastructure software, and includes DRS (Distributed Resource Scheduler) as technology for realizing flexible resource control and distribution of operation hosts (refer to NPL 1). With DRS, load leveling is possible by measuring the load for every compute and transitioning the VM from a high load compute to a low load compute through live migration in the case where bias occurs.

OpenStack is an open source software group for building cloud environments, and includes Watcher which is a component designed for resource optimization (refer to NPL 2). Watcher sets the load average of the computes and a target index value of power optimization, and automatically executes migration and the like toward achieving those values.

On the other hand, much communication software has enhanced availability by adopting an HA (High Availability) configuration such as an ACT (Active)/SBY (Standby) configuration or an N+M configuration. For example, with an ACT/SBY configuration, there is an operating (active) component and a component on hold (standby), and if a failure arises in the active component, the standby component takes over the processing, thus enabling service outages to be averted and outage times to be kept very short.

CITATION LIST

Non Patent Literature

[NPL 1] "vSphere DRS" [online], 2018 Oct. 3, VMware, Inc., [viewed on Oct. 25, 2018], Internet <URL: https://blogs.vmware.com/jp-cim/2014/02/vspheredrs.html>
[NPL 2] "Watcher" [online], [viewed on Oct. 25, 2018], Internet <URL: https://wiki.openstack.org/wiki/Watcher>
[NPL 3] "SR-IOV", OpenStack Docs [online], [viewed on Oct. 25, 2018], Internet <URL: https://docs.openstack.org/newton/networking-guide/config-sriov.html>

SUMMARY OF THE INVENTION

Technical Problem

In a system employing a virtual infrastructure, there may be cases, when a plurality of applications are loaded, where the load is biased between the computes constituting the virtual infrastructure, due to VM generation and deletion, migration, and the like being repeatedly performed.

In particular, when applications employing an ACT/SBY configuration are loaded in a virtual infrastructure, the Active VM is responsible for request processing and thus has a high load, whereas the Standby VM has a low load. Thus, load bias readily occurs. When such load bias occurs, there is a possibility that applications loaded in a high load compute may be affected in the terms of performance degradation and the like.

The technology described in NPL 1 has a mechanism for leveling the load by measuring the load for every compute, and, in the case where bias occurs, transitioning VMs from high load computes to low load computes through live migration.

However, in order to achieve greater speed and efficiency of network IO (Input/Output) at the time of virtualizing network devices having high performance requirements, technology such as SR-IOV (Single Root I/O Virtualization) (refer to NPL 3), for example, may be utilized, although there are cases where restrictions (hereinafter, "application restrictions on the virtualization technique") arises in terms of not being able to apply live migration at that time, depending on the virtual infrastructure.

Also, since live migration of VMs requires time for migration depending on the virtual storage configuration and the allocated resource amount, there may be concerns about executing live migration frequently for the purpose of load leveling. For example, when a virtual machine instance is starting up using an ephemeral disk, it takes time since processing (block migration) for copying the contents of the virtual disk image between the instance before transition and the instance after transition is required.

The present invention has been made in view of such issues, and an object of the invention is to provide a load leveling apparatus, a load leveling method and a load leveling program that are able to realize load leveling between hosts (computes) in a virtual infrastructure regardless of application restrictions on the virtualization technique and by reducing the influence on services.

Means for Solving the Problem

In order to solve the above object, the invention according to claim 1 is a load leveling apparatus for loading an application employing an ACT (Active)/SBY (Standby) configuration in a VM (Virtual Machine) built on a compute of a different virtual infrastructure, and performing load leveling of a plurality of the computes through coordinated operation with the virtual infrastructure, assuming a redundant configuration of a pair of VMs formed by an Active VM and a Standby VM, the apparatus including a storage unit that stores redundant configuration management information storing an identifier of each VM forming the pair that is associated with the application, a load determination unit that acquires load information indicating a load for the compute of each of the VMs, calculates the load of each compute by totaling the load information for every compute in which the VMs are disposed, calculates a standard deviation of the calculated load of each compute, and, in a case where the calculated standard deviation is larger than a predetermined reference standard deviation, determines that there is a large load bias between the computes, a VM disposition determination unit that, in a case where it is determined that there is a large load bias between the computes, extracts the compute having the highest load among the calculated loads of the computes, selects a VM that is disposed in the extracted compute, specifies a VM forming a pair with the selected VM with reference to the redundant configuration management information, and determines the selected VM and the specified VM forming the pair as a pair of VMs for performing switching of an Active VM and a Standby VM, and a switching instruction unit that outputs instruction information for switching the determined pair of VMs.

The invention according to claim 4 is a load leveling method of a load leveling apparatus for loading an application employing an ACT (Active)/SBY (Standby) configuration in a VM (Virtual Machine) built on a compute of a different virtual infrastructure, and performing load leveling of a plurality of the computes through coordinated operation with the virtual infrastructure, assuming a redundant configuration of a pair of VMs formed by an Active VM and a Standby VM, and the load leveling apparatus including a storage unit that stores redundant configuration management information storing an identifier of each VM forming the pair that is associated with the application, the method including a step of acquiring load information indicating a load for the compute of each of the VMs, calculating the load of each compute by totaling the load information for every compute in which the VMs are disposed, calculating a standard deviation of the calculated load of each compute, and, in a case where the calculated standard deviation is larger than a predetermined reference standard deviation, determining that there is a large load bias between the computes, a step of, in a case where it is determined that there is a large load bias between the computes, extracting the compute having the highest load among the calculated loads of the computes, selecting a VM that is disposed in the extracted compute, specifying a VM forming a pair with the selected VM with reference to the redundant configuration management information, and determining the selected VM and the specified VM forming the pair as a pair of VMs for performing switching of an Active VM and a Standby VM, and a step of outputting instruction information for switching the determined pair of VMs.

By adopting such a configuration, the load leveling apparatus acquires the load information of VMs, and calculates the load of each compute, and, in the case where the standard deviation of the calculated load of each compute is larger than a predetermined reference standard deviation, determines that there is a large load bias between the computes.

The load leveling apparatus is then able to select a VM that is disposed in the compute having the highest load, and output instruction information for switching VMs forming a pair. Therefore, the load leveling apparatus is able to realize load leveling between computes, even in the case where there are application restrictions on the virtualization technique such as SR-IOV or the like being set, in the virtual infrastructure, for example.

The invention according to claim 2 is the load leveling apparatus according to claim 1, in which the VM disposition determination unit, when the compute having the highest load among the calculated loads of the computes is extracted, selects a VM in descending order of load among the VMs disposed in the extracted compute, specifies a VM forming a pair with the selected VM with reference to the redundant configuration management information, simulates the load of each compute in a case where the selected VM and the specified VM forming the pair are switched, repeatedly selects a VM disposed in the extracted compute until the standard deviation of the simulated load of each compute is less than or equal to the predetermined reference standard deviation, and determines a pair of VMs for switching.

By adopting such a configuration, the load leveling apparatus determines the pair of VMs to undergo switching, such that the standard deviation will be less than or equal to the predetermined reference standard deviation, and is thus able to realize load leveling more reliably.

The invention according to claim 3 is the load leveling apparatus according to claim 1 or 2, in which the storage unit stores a live migration time indicating a time taken in a case where a VM disposed in the compute undergoes live migration to another compute, and a switching time indicating a time taken in a case where a VM disposed in the compute underwent switching based on the instruction information in the past, and the load leveling apparatus further includes a leveling technique setting unit that calculates an average value of the switching time for a predetermined period, compares the calculated average value of the switching time with the live migration time, and, if the live migration time is shorter, outputs setting information for enabling a load leveling function by live migration, and, if the average value of the switching time is shorter, outputs setting information for disabling the load leveling function by live migration.

In this way, the load leveling apparatus is able to set the shorter load leveling technique by comparing the average value of the switching time with the live migration time. Therefore, load leveling between computes can be realized by reducing the influence on services.

The invention according to claim 5 is a load leveling program for causing a computer to function as the load leveling apparatus any one of claims 1 to 3.

By adopting such a configuration, the functions of the load leveling apparatus according to any one of claims 1 to 3 can be realized using a typical computer.

Effects of the Invention

According to the present invention, a load leveling apparatus, a load leveling method and a load leveling program that realize load leveling between hosts (computes) in a virtual infrastructure regardless of application restrictions on the virtualization technique and by reducing the influence on services can be provided.

BRIEF DESCRIPTION OF DRAWINGS

FIG. 3 is a diagram showing an example of the data configuration of a resource management table (resource management information) according to the embodiment.

FIG. 4 is a diagram showing an example of the data configuration of a redundant configuration management table (redundant configuration management information) according to the embodiment.

DESCRIPTION OF EMBODIMENTS

Next, a mode (hereinafter, "the present embodiment") for carrying out the present invention will be described. First, a summary of the processing that is executed by a load leveling apparatus 10 (refer to FIG. 2 described later) according to the present embodiment will be described.

Summary

Figure 1:
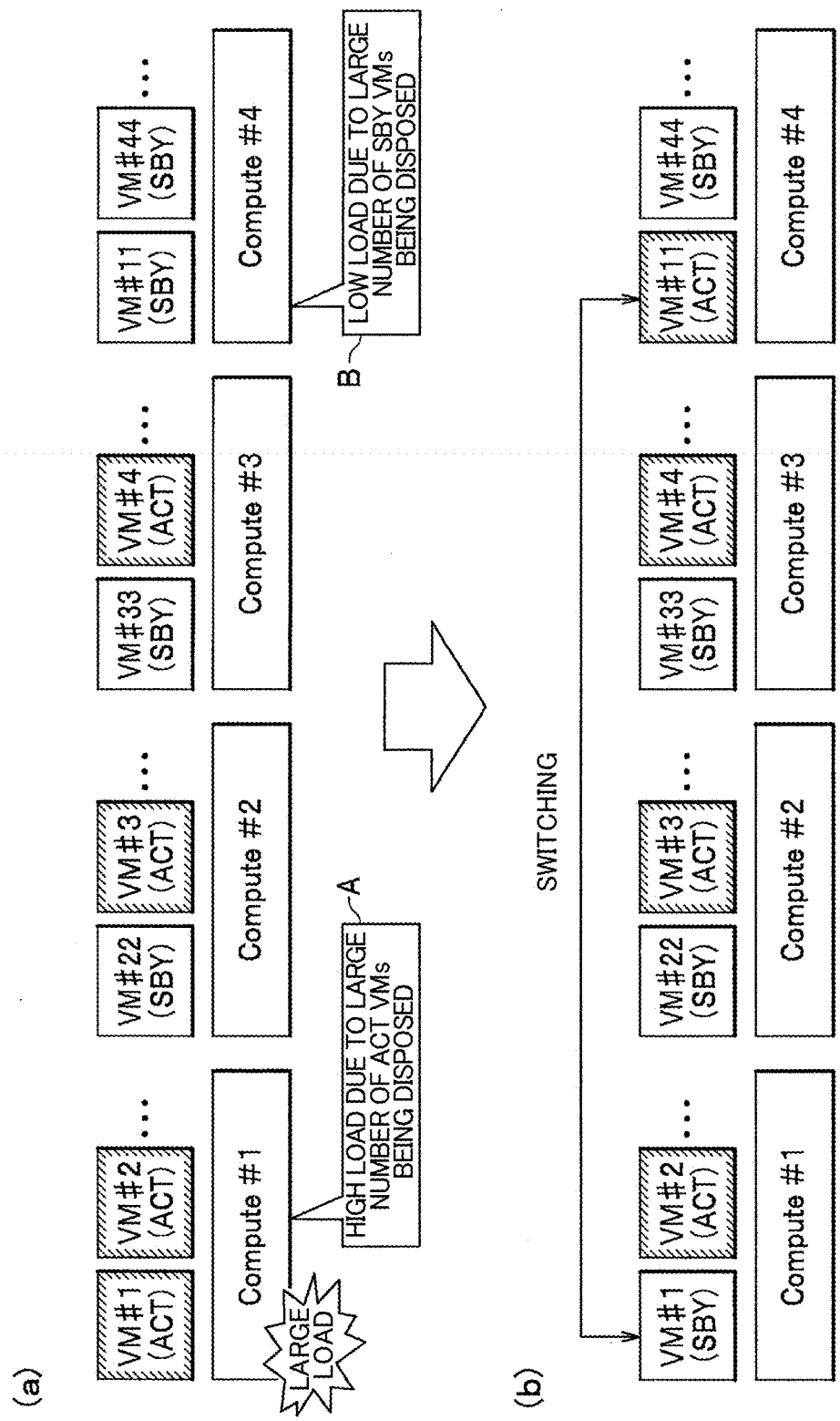
FIG. 1 is a diagram for describing a summary of processing by a load leveling apparatus according to an embodiment.

FIG. 1 is a diagram for describing a summary of processing by the load leveling apparatus 10 according to the present embodiment.

As described above, depending on the virtual infrastructure ("virtual infrastructure control apparatus 20" in FIG. 2 described later), cases can arise where the load is biased between computes constituting the virtual infrastructure due to VM generation, deletion, migration and the like being repeatedly performed in the case where a plurality of applications are loaded in a compute. In particular, in the case where an application employing an ACT/SBY configuration is loaded in the virtual infrastructure, load bias readily occurs in which Active VMs have a high load due to being responsible for request processing, whereas Standby VMs have a low load.

In view of this, the load leveling apparatus 10 according to the present embodiment monitors the load of each host (compute) and detects for load bias, when applications employing an ACT/SBY configuration are loaded in VMs of a virtual infrastructure. The load leveling apparatus 10 is characterized by then reducing the load bias, by switching the Active VM (ACT VM) and the Standby VM (SBY VM), in the case where load bias is detected.

Here, in FIG. 1, VM "#1" (ACT) and VM "#11" (SBY) are a redundant configuration pair, and VM "#2" (ACT) and VM "#22" (SBY), VM "#3" (ACT) and VM "#33" (SBY), and VM "#4" (ACT) and VM "#44" (SBY) are similarly redundant configuration pairs.

In this case, as shown in FIG. 1(a), the compute "#1" has a high load since a large number of ACT VMs are disposed therein (refer to reference sign A). On the other hand, the compute "#4" has a low load since a large number of SBY VMs are disposed therein (refer to reference sign B). When such load bias occurs, there is a possibility of applications loaded in the compute having the high load being affected in terms of performance degradation.

In view of this, as shown in FIG. 1(b), load leveling is realized by performing switching of an Active VM and a Standby VM, with a VM (here, VM "#1") disposed in the compute (compute "#1") having a high load and a VM (here, VM "#11") disposed in the compute (compute "#4") having a low load.

By adopting such a configuration, the load leveling apparatus 10 according to the present embodiment is able to realize load leveling between hosts (computes) regardless of application restrictions on the virtualization technique and by reducing the influence on services.

Present Embodiment

Next, a load leveling system 1 that includes the load leveling apparatus 10 will be described.

Figure 2:
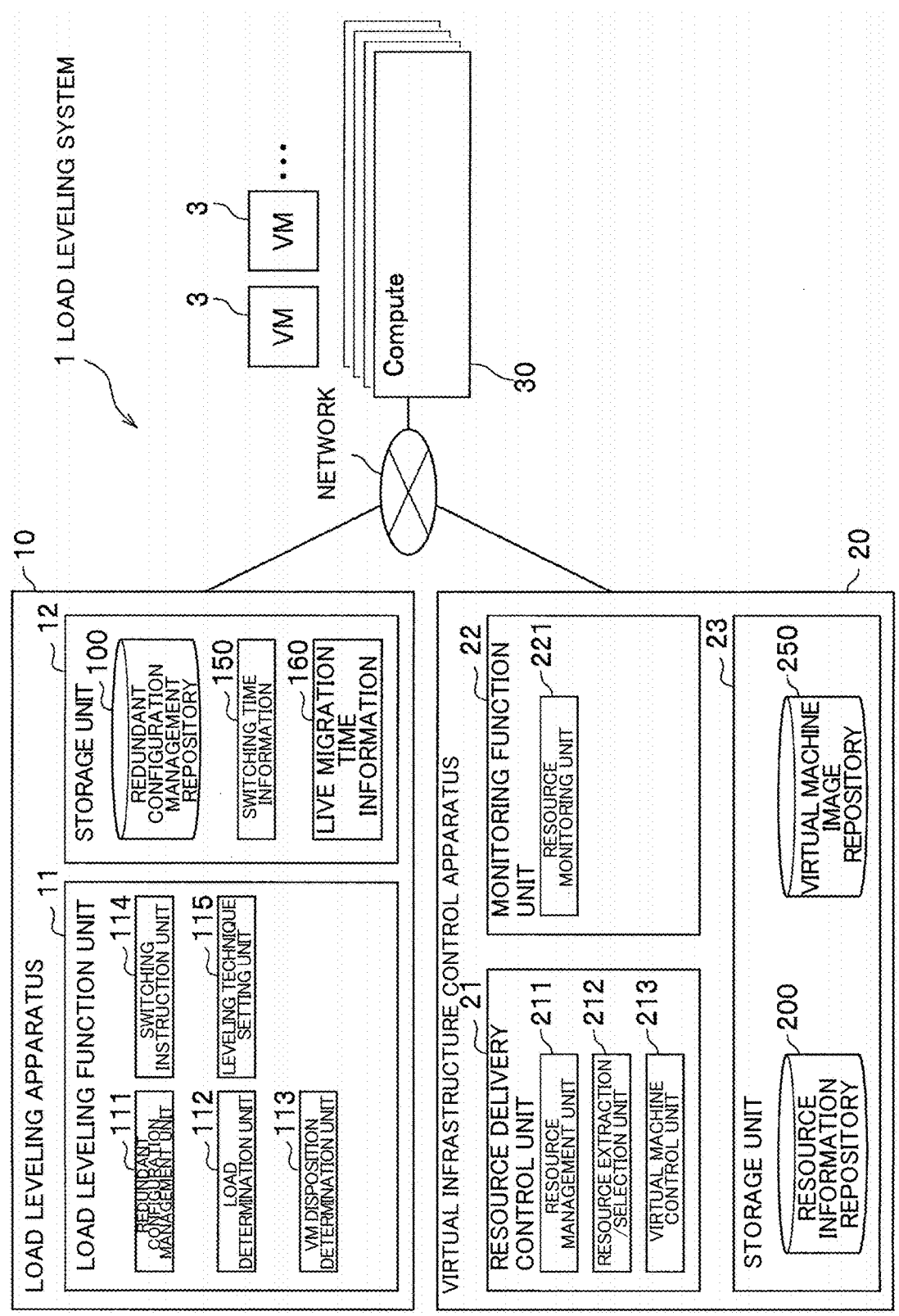
FIG. 2 is a diagram showing the configuration of a load leveling system that includes the load leveling apparatus according to the embodiment.

FIG. 2 is a diagram showing the configuration of the load leveling system 1 that includes the load leveling apparatus 10 according to the present embodiment.

In the load leveling system 1, a plurality of computes 30 (physical resources: hosts (computers) operated by VMs), a virtual infrastructure control apparatus (virtual infrastructure) 20 and the load leveling apparatus 10 are communicably connected via a network or the like.

In the computes 30, one or more VMs 3 can be built as a virtual environment, under the control of the virtual infrastructure control apparatus 20. Also, in the VMs 3, one or more applications can be disposed (loaded), and services that are based on requests from user terminals (not shown) are provided.

The virtual infrastructure control apparatus 20 is communicably connected to the load leveling apparatus 10, each compute 30 and the like, and performs control of the VMs 3, allocation of resources, and the like. Also, the virtual infrastructure control apparatus 20 performs resource monitoring of each compute 30 and each VM 3.

The load leveling apparatus 10 is communicably connected to the virtual infrastructure control apparatus 20 and the like, acquires information on the load (load information) of each VM 3, and, in the case where load bias is detected in a compute 30, outputs instruction information for switching of the ACT/SBY configuration of VMs 3 forming a pair, in order to reduce the load bias.

Hereinafter, the virtual infrastructure control apparatus 20 and the load leveling apparatus 10 will be described in detail.

<<Virtual Infrastructure Control Apparatus>>

The virtual infrastructure control apparatus (virtual infrastructure) 20 is realized by a computer or the like provided with a control unit, an input/output unit (both not shown), a storage unit 23, and the like.

The input/output unit consists of a communication interface for performing transmission and reception of information and an input/output interface for performing transmission and reception of information between input devices such as a touch panel and a keyboard and output devices such as a monitor.

The storage unit 23 is constituted by a flash memory, a hard disk, a RAM (Random Access Memory), or the like. The storage unit 23 of this virtual infrastructure control apparatus 20, as shown in FIG. 2, stores a resource information repository 200 and a virtual machine image repository 250.

The resource information repository 200 stores a resource management table 210 (resource management information)

that includes information (information on allocation destination) on the VMs 3 built in each compute 30 (refer to FIG. 3 described later). Also, the virtual machine image repository 250 stores VM images which are templates for starting up virtual instances (VM) that include an installed guest OS.

Also, the control unit is, as shown in FIG. 2, constituted to include a resource delivery control unit 21 and a monitoring function unit 22. Note that this control unit is also provided with other existing functions that are required in order to realize the virtual infrastructure.

The resource delivery control unit 21 performs resource management and allocation of resources to the VMs 3, and is provided with a resource management unit 211, a resource extraction/selection unit 212, and a virtual machine control unit 213.

The resource management unit 211 manages the resource status of each compute 30 (host) using the resource management table 210 (refer to FIG. 3).

FIG. 3 is a diagram showing an example of the data configuration of the resource management table 210 (resource management information) according to the present embodiment. The resource management table 210 stores information on the "allocation destination" of the VMs 3 in association with "HW Ids" which are identification information of the computes 30 (physical resource).

For example, as shown in FIG. 3, it is shown that VM "#1" and VM "#2" are allocated to a compute 30 whose HW Id is "#0".

Also, this resource management table 210 may be configured to store the "multiplexing rate" or "usage rate" of that compute 30 in association with the "HW Id".

The "multiplexing rate" is the ratio (CPU performance ratio) of the CPU performance of each compute 30 to the CPU performance of a CPU serving as a reference, and represents the upper limit of the "usage rate" of allocatable CPUs. This multiplexing rate is, as shown in FIG. 3, set to a value according to the performance ratio of the compute 30, rather than 1005 being the upper limit. A highly efficient compute 30 is set to a value greater than 100% (e.g., "150%"). Even in a system that is constituted by computes 30 (physical servers) having different performances, resources can thereby be allocated, based on one piece of resource request information. The "usage rate" shows the accumulated CPU usage rate for allocated virtual CPUs.

The resource extraction/selection unit 212, in the case where resource request information (VM startup request) is received, extracts allocatable resources (allocation destination physical resource candidates), and selects an allocation destination physical resource by a predetermined allocation policy from among the candidates.

The virtual machine control unit 213 starts the VMs 3 for the compute 30 selected by the resource extraction/selection unit 212, using a VM image stored in the virtual machine image repository 250.

The monitoring function unit 22 is provided with a resource monitoring unit 221 that monitors the loads of the computes 30 and the VMs 3.

The resource monitoring unit 221, for example, monitors the CPU usage rate, the memory usage rate and the like of each compute 30 and VM 3, and acquires and stores these rates and the like as load information in the storage unit 23. Also, the resource monitoring unit 221 is assumed to execute monitoring of the load of each compute 30 at a predetermined time interval (here, "monitoring interval α") set in advance.

This virtual infrastructure control apparatus 20 is additionally provided with a load leveling function by live migration (not shown), as a function that is included in existing virtual infrastructures. The virtual infrastructure control apparatus 20 is also provided with a function for replying with setting information such as the configuration of each compute 30, in the case where there is an inquiry for setting information such as the configuration of each compute 30 from the load leveling apparatus 10.

Note that, in the load leveling system 1 that includes the load leveling apparatus 10 according to the present embodiment, the operation and function of the present invention can be realized by directly utilizing the applications and IFs (interfaces) of an existing virtual infrastructure (virtual infrastructure control apparatus 20) without modification. Therefore, the burden on the system administrator or the like in terms of system modification at the time of executing the present invention can be reduced.

<<Load Leveling Apparatus>>

The load leveling apparatus 10 acquires information (load information) from the virtual infrastructure control apparatus 20 or the like as a result of the resource monitoring of the VMs 3, calculates the load ("host load" described later) of the computes 30, and, in the case where load bias is detected, outputs instruction information for switching the ACT/SBY configuration of VMs 3 forming a pair, in order to reduce this load bias.

Note that the load leveling apparatus 10 acquires setting information such as the configuration of each compute 30 that is targeted through inquiry to the virtual infrastructure control apparatus 20, and determines whether the configuration allows for live migration. The load leveling apparatus 10 then, in the case where live migration is possible, compares (the average value of) the switching time with the migration time, and executes load leveling (described in detail later) employing the technique having the shorter time.

The load leveling apparatus 10 is realized by a computer or the like provided with a control unit, an input/output unit (both not shown), and a storage unit 12. The input/output unit consists of a communication interface for performing transmission and reception of information and an input/output interface for performing transmission and reception of information between input devices such as a touch panel and a keyboard and output devices such as a monitor.

The storage unit 12 is constituted by a flash memory, a hard disk, a RAM or the like. This storage unit 12 of the load leveling apparatus 10, as shown in FIG. 2, stores a redundant configuration management repository 100, switching time information 150, and live migration time information 160 (described in detail later). Also, this storage unit 12 temporarily stores a program (load leveling program) for executing the functions of the control unit and information required in processing by the control unit.

Also, the control unit, as shown in FIG. 2, is provided with a load leveling function unit 11, and executes load leveling processing of the computes 30.

This load leveling function unit 11 is constituted to include a redundant configuration management unit 111, a load determination unit 112, a VM disposition determination unit 113, a switching instruction unit 114, and a leveling technique setting unit 115.

The redundant configuration management unit 111, in the case where information on the allocation destination of the resource management table 210 (FIG. 3) stored in the storage unit 23 (resource information repository 200) of the virtual infrastructure control apparatus 20, that is, information on the VMs 3 that are built in the computes 30, is updated, acquires the update information, and updates a redundant configuration management table 110 (redundant configuration management information) stored in the storage unit 12 (redundant configuration management repository 100) thereof. Note that the redundant configuration management unit 111 may acquire update information through inquiry to the virtual infrastructure control apparatus 20 about whether the resource management table 210 has been updated, at a predetermined time interval (e.g., monitoring interval α). Also, the resource management unit 211 of the virtual infrastructure control apparatus 20 may be set to notify update information to the load leveling apparatus 10, in the case where the resource management table 210 has been updated.

FIG. 4 is a diagram showing an example of the data configuration of the redundant configuration management table 110 (redundant configuration management information) according to the present embodiment.

The redundant configuration management table 110 stores the IDs (identifiers) (VM IDs) of VMs 3 forming pairs of redundant configurations in association with application names (Apps) and application IDs (App IDs), and IP addresses (Virtual IPs) associated with the applications (Apps).

As shown in FIG. 4, for example, the VMs 3 forming a pair of the redundant configuration (ACT/SBY configuration) that correspond to an application whose application name (App) is "VNF1" and application ID (App ID) is "#01" are VMs 3 having VM IDs "#1" and "#11", and the Virtual IP thereof is "192.168.xx.xx".

Note that the switching the Active VM and the Standby VM may be executed depending not only on the state of the computes 30 and the VMs 3 but also depending on the individual requirements of the applications (purposes such as maintenance and software upgrade). Thus, the state (App state) of which VM 3 is the ACT VM and which is the SBY VM may not be managed in the resource management table 210 (FIG. 3) or the like provided in an virtual infrastructure control apparatus 20 (virtual infrastructure) that does not take the individual requirements of applications into consideration. As a result, by adopting a configuration in which the App state is not managed in the redundant configuration management table 110 or the like, and not providing a function for executing the individual requirements of applications, even on the load leveling apparatus 10 side, a system that is commonly utilizable for various applications can be realized.

Returning to FIG. 2, the load determination unit 112 calculates a "host load" as the load of each compute 30. The load determination unit 112 calculates the host load by the following [Formula 1].

Host load=(total value of loads of VMs loaded in host)/(capacity of host)   [Formula 1]

Here, for example, if the CPU usage rate is given as an index, the loads of VMs 3 are the CPU usage rates of the respective VMs 3, and the capacity of the host will be 100.

The load determination unit 112 may be configured to acquire the load information of the VMs 3 directly from the VMs 3, or may be configured to acquire the load information of the VMs 3 from the virtual infrastructure control apparatus 20.

Also, the load determination unit 112 calculates the host load at a predetermined time interval (e.g., calculation interval β) set in advance. Note that the calculation interval β is a constant multiple of the monitoring interval α.

The load determination unit 112, with regard to the load (host load) of each compute 30, may be configured to utilize the value of the load information of the VM 3 acquired closest in time to the load calculation time, or may be configured to utilize the average value, the weighted average value or the like of a past predetermined period. The weighting of this weighted average value may, in the case of data of times t1, t2 and t3 from earliest to latest, for example, be performed by applying the highest weight to the latest time t3.

The load determination unit 112 calculates the standard deviation of the host loads of all the hosts, when the host load of each host (compute 30) has been calculated. The load determination unit 112 then determines, in the case where the calculated standard deviation of the host loads is larger than a (predetermined) reference standard deviation γ set in advance, that there is a large load bias between the hosts, and outputs information to that effect ("host load bias notification" described later) to the VM disposition determination unit 113.

Note that the technique for determining the load bias of the computes 30 (hosts) by the load determination unit 112 is not limited to the above technique. For example, the number of Active VMs and Standby VMs may be taken as the load, and the load bias may be determined by comparing this number.

The VM disposition determination unit 113 extracts the host (compute 30) having the largest average value of the host load for a predetermined period, and selects the VM 3 having the highest load within that host. The VM disposition determination unit 113 then determines the VM (Standby VM) forming a pair with that VM (Active VM) as a switching candidate, with reference to the redundant configuration management table 110 (FIG. 4). The VM disposition determination unit 113 determines through simulation whether the average value of the host load will be less than or equal to an index value δ in the case where the pair serving as the switching candidate is switched. In the case where the average value of the host load is not less than or equal to an index value δ, the VM disposition determination unit 113 selects the VM 3 having the next highest load and the VM 3 paired therewith as the switching candidate, and repeats this processing until the average value of host load becomes less than or equal to the index value δ. The VM disposition determination unit 113 then determines the pair serving as the switching candidate at the time at which the average value of host load becomes less than or equal to the index value δ as the pair for switching. Note that a detailed description will be given later using FIG. 7.

Note that the technique performed by the VM disposition determination unit 113 for determining the pair of VMs 3 to be switched is not limited to the above technique. For example, a configuration may be adopted in which optimal/semi-optimal switching proposals are calculated utilizing the solution of an existing combinatorial optimization problem.

The switching instruction unit 114 gives an instruction for switching the pair of VMs 3 determined by the VM disposition determination unit 113 to the VMs 3 or the like.

A configuration may be adopted in which execution of switching is performed automatically, or is performed manually via the system administrator. Also, a configuration may be adopted in which the switching instruction is given directly to the VMs 3, or is given to the VMs 3 via an EMS (Element Management System) that manages the applications.

The leveling technique setting unit 115 acquires setting information such as the configuration of each compute 30 that is targeted through inquiry to the virtual infrastructure control apparatus 20, and determines whether the configuration allows for live migration. Note that the technology regarding this determination is, for example, detailed in NPL 4 (https://docs.openstack.org/nova/queens/admin/configuring-migrations.html#section-configuring-compute-migrations). The leveling technique setting unit 115 then, in the case where live migration is possible, compares switching times indicating the times measured for (past) switching performed prior to that performed as a result of the switching instruction of the load leveling apparatus 10 with the time (hereinafter, "live migration time") taken for live migration, and employs the technique whose time is shorter as the load leveling technique.

Specifically, the leveling technique setting unit 115, in the case where switching is performed between a pair of VMs 3 of the ACT/SBY configuration, based on the instruction of the switching instruction unit 114, acquires the time taken for switching, and stores this time in the storage unit 12 as the switching time information 150. For example, the switching instruction unit 114 may be configured to acquire the switching time together with a switching completion acknowledgement.

A configuration may be adopted in which information measured by the application that is executed by the VMs 3 is acquired as this switching time information 150, or information measured by an EMS is acquired thereas. A configuration may also be adopted in which state monitoring is performed by polling the application from the switching instruction unit 114 at a predetermined time interval, and the switching time is measured.

Also, in relation to the live migration time, the leveling technique setting unit 115 acquires the live migration time executed using an existing load leveling technique by live migration from the virtual infrastructure control apparatus 20 or the like, and stores this live migration time in the storage unit 12. Alternatively, a configuration may be adopted in which the system administrator or the like verifies the live migration time beforehand, and the leveling technique setting unit 115 sets a fixed value from the result of verification, and stores this fixed value in the storage unit 12 as the live migration time information 160.

The leveling technique setting unit 115 calculates the average value of the switching time for a predetermined time (period), using the switching time information 150 and the live migration time information 160, with reference to the storage unit 12, compares the calculated average value of the switching time for the predetermined time with the live migration time, and employs (sets) the load leveling technique whose time is shorter.

Note that when switching the load leveling technique to live migration, the leveling technique setting unit 115 transmits a setting instruction for enabling the load leveling function by live migration of the virtual infrastructure control apparatus 20. Also, the leveling technique setting unit 115, in the case where the load leveling technique by switching is employed, after having enabled the load leveling function by live migration of the virtual infrastructure control apparatus 20, transmits a setting instruction for disabling the load leveling function by live migration of the virtual infrastructure control apparatus 20.

By adopting such a configuration, a load leveling technique that minimizes the influence on services due to stoppage of applications or the like accompanying load leveling can be set.

Note that although, in FIG. 2, the load leveling apparatus 10 and the virtual infrastructure control apparatus 20 are illustrated as separate apparatuses (separate casings), a configuration may be adopted in which the constituent elements of the load leveling apparatus 10 are incorporated in the virtual infrastructure control apparatus 20 and constituted as one apparatus.

<Processing Flow>

Next, the flow of processing that is executed by the load leveling apparatus 10 will be described, with reference to FIGS. 5 to 8. First, startup processing of VMs 3 by the virtual infrastructure control apparatus 20 will be described, with reference to FIG. 5. For example, the redundant configuration management table 110 (FIG. 4) in the storage unit 12 (redundant configuration management repository 100) of the load leveling apparatus 10 is updated, triggered by this startup processing of VMs 3.

(Updating of Redundant Configuration Management Table Accompanying VM Startup Processing)

Figure 5:
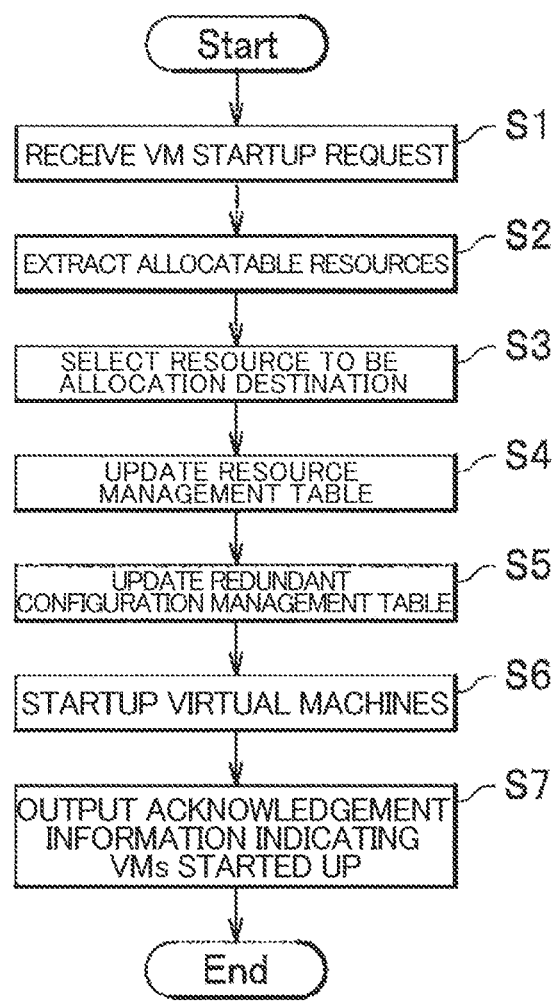
FIG. 5 is a flowchart showing the flow of the startup processing of VMs in the load leveling system according to the embodiment.

FIG. 5 is a flowchart showing the flow of startup processing of VMs 3 in the load leveling system 1 according to the present embodiment.

First, the resource delivery control unit 21 of the virtual infrastructure control apparatus 20 receives a startup request for new VMs 3 (step S1). Note that, here, description will be given assuming that startup of two VMs 3 forming a pair as an ACT/SBY configuration has been requested.

When a startup request is received in step S1, the resource extraction/selection unit 212 of the resource delivery control unit 21 extracts allocatable resources (allocation destination physical resource candidates), with reference to the resource management table 210 (FIG. 3) in the resource information repository 200 of the storage unit 23 (step S2). The resource extraction/selection unit 212 then selects a resource (compute 30) to serve as the allocation destination, from among the extracted candidates, by a predetermined allocation policy (step S3).

The predetermined allocation policy is a rule such as applying an affinity rule and an anti-affinity rule, applying fixed allocation of CPUs (CPU Pinning), or selecting a compute 30 having a low usage resource amount of VMs 3 that are already allocated, for example. This predetermined allocation policy is an existing VM allocation destination selection technique, and is, for example, detailed in NPL 5 (https://docs.openstack.org/ocata/config-reference/compute/schedulers.html).

When a compute 30 to serve as the allocation destination of the VMs 3 to be started up in step S3 has been selected, the resource management unit 211 updates the resource management table 210 (FIG. 3) in the resource information repository 200 (step S4). Specifically, the resource management unit 211 adds the VM IDs of the VMs 3 to be newly started up to the "allocation destination" column corresponding to the HW Id of the selected compute 30. Here, the VM IDs of two VMs 3 forming a pair as an ACT/SBY configuration are registered.

The resource management unit 211 then notifies update information indicating that the resource management table 210 has been updated to the load leveling apparatus 10.

The redundant configuration management unit 111 of the load leveling apparatus 10, upon receiving the update information from the virtual infrastructure control apparatus 20, updates the redundant configuration management table 110 (FIG. 4) in the redundant configuration management repository 100 (step S5).

Next, the virtual machine control unit 213 of the virtual infrastructure control apparatus 20 starts up the new VMs 3, using a VM image corresponding to the compute 30 selected in step S4, with reference to the virtual machine image repository 250 in the storage unit 23 (step S6).

The resource management unit 211 then outputs acknowledgement information indicating that the new VMs 3 have been started up (step S7), and ends the processing.

By adopting this configuration, whenever new VMs 3 are started up and the settings are updated by the virtual infrastructure control apparatus 20, the load leveling apparatus 10 acquires update information, and it becomes possible to update the redundant configuration management table 110 to the latest state.

Note that although, in FIG. 5, a configuration was described in which starting up of two VMs 3 forming a pair as an ACT/SBY configuration is requested once, a configuration may be adopted in which the VMs 3 forming a pair as an ACT/SBY configuration are started up separately. In that case, after updating the resource management table 210 (FIG. 3) with regard to each VM 3, the resource management unit 211 of the virtual infrastructure control apparatus 20 notifies update information indicating that the resource management table 210 has been updated to the load leveling apparatus 10.

(Load Bias Determination Processing)

Next, load bias determination processing by the load determination unit 112 of the load leveling apparatus 10 will be described.

Figure 6:
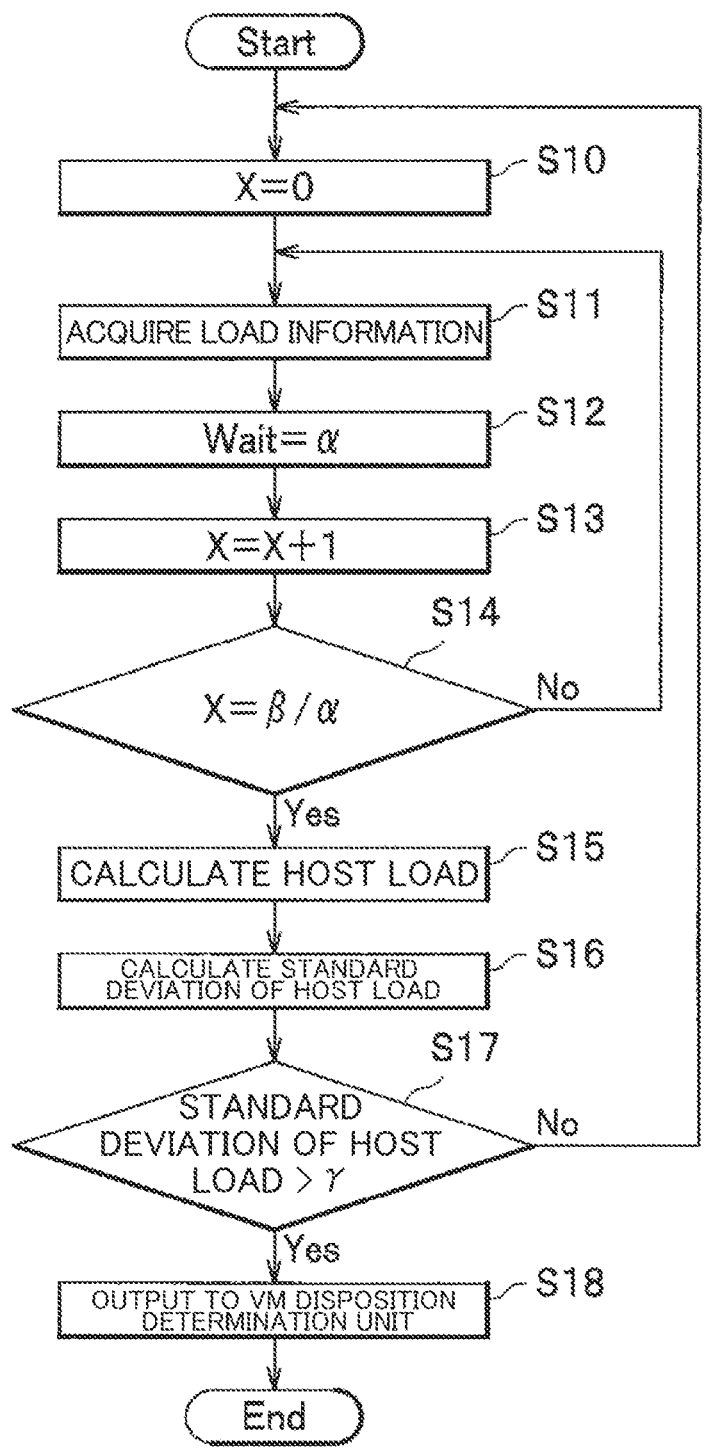
FIG. 6 is a flowchart showing the flow of load bias determination processing that is executed by the load leveling apparatus according to the embodiment.

FIG. 6 is a flowchart showing the flow of load bias determination processing that is executed by the load leveling apparatus 10 according to the present embodiment.

The load determination unit 112 calculates the load (host load) of each compute 30, and calculates the standard deviation of these loads. The load determination unit 112 then determines whether the load bias is larger than the (predetermined) reference standard deviation γ set in advance, based on the calculated host load, and, if the load bias is larger, determines that there is a large load bias between the hosts.

Note that, here, the resource monitoring unit 221 of the virtual infrastructure control apparatus 20 is assumed to monitor the loads of the hosts (computes 30) and the VMs 3 at the monitoring interval α. Hereinafter, a specific description will be given.

First, the load determination unit 112 sets a constant X for controlling the number of times that load information which is the load monitoring result is acquired to 0 (X=0) (step S10).

Next, the load determination unit 112 acquires the load information of each VM 3 (here, CPU usage rate) (step S11). The load determination unit 112, for example, acquires load information from the virtual infrastructure control apparatus 20 every predetermined time interval (e.g., monitoring interval α). The load determination unit 112 then may determine the load bias using the load information stored in the storage unit 12, or may transmit request information to the virtual infrastructure control apparatus 20 every predetermined time interval and acquire load information.

Next, the load determination unit 112 waits until the monitoring interval α has elapsed (Wait=a) (step S12). The load determination unit 112 then adds 1 to X (X=X+1) (step S13).

Next, the load determination unit 112 determines whether the calculation interval R (R being a fixed multiple of a) set beforehand for the host load calculation has elapsed. Specifically, the load determination unit 112 determines whether the calculation interval β has elapsed depending on whether X=β/α holds true (step S14).

Here, if X=β/α does not hold true (step S14→No), the load determination unit 112 returns to step S11 and continues the processing for acquiring load information.

On the other hand, if X=β/α holds true (step S14→Yes), the load determination unit 112 advances to the following step S15.

In step S15, the load determination unit 112 calculates the host load of each host (compute 30) by the [Formula 1].

Here, in the case where the CPU usage rate is given as an index of the load, the loads of the VMs 3 are the CPU usage rates of the respective VMs 3, and the capacity of the host is calculated as 100.

Note that the value of the load acquired closest in time to the calculation time may be used for the load, or the average value of a past predetermined period may be used. Also, a weighted average value may be used.

Next, the load determination unit 112 calculates the standard deviation of the host load of each host (compute 30) (step S16).

The load determination unit 112 then determines whether the calculated standard deviation of the host load is larger than the (predetermined) reference standard deviation γ set in advance (step S17).

Here, if the standard deviation of the host load is less than or equal to the reference standard deviation γ (step S17→No), the load determination unit 112 determines that the load bias of the hosts is not large, and returns to step S10. On the other hand, if the standard deviation of the host load is larger than the reference standard deviation γ (step S17→Yes), the load determination unit 112 determines that the load bias of the hosts is large, and advances to the following step S18.

In step S18, the load determination unit 112 outputs information (host load bias notification) indicating that the load bias of the hosts 3 was determined to be large to the VM disposition determination unit 113, and ends the processing.

By adopting such a configuration, the load leveling apparatus 10 (load determination unit 112) is able to determine whether the load of each host is larger than a predetermined reference.

(Switching Instruction Output Processing)

Next, switching instruction output processing by the VM disposition determination unit 113 and the switching instruction unit 114 of the load leveling apparatus 10 will be described.

Figure 7:
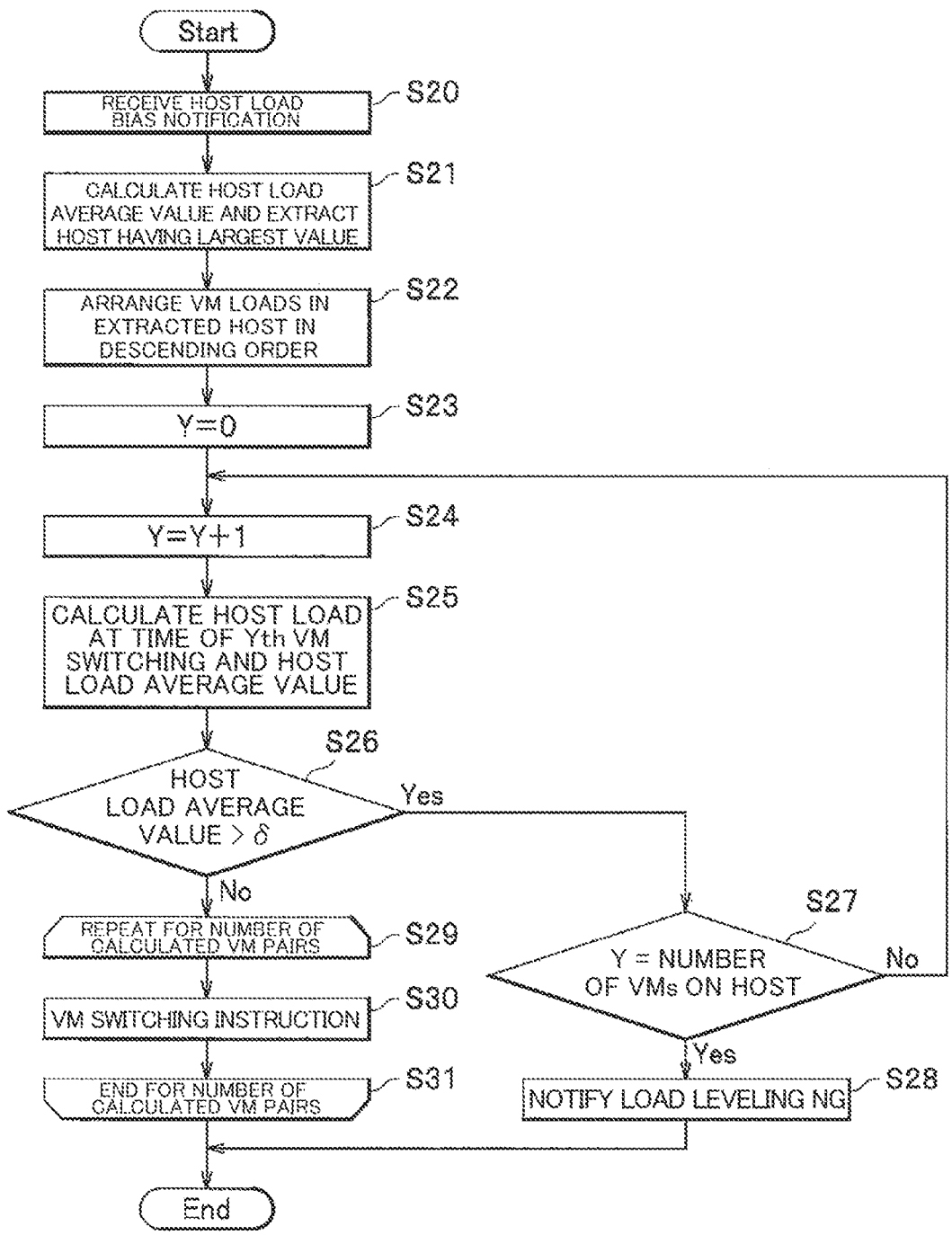
FIG. 7 is a flowchart showing the flow of switching instruction output processing that is executed by the load leveling apparatus according to the embodiment.

FIG. 7 is a flowchart showing the flow of switching instruction output processing that is executed by the load leveling apparatus 10 according to the present embodiment.

The VM disposition determination unit 113, upon information (host load bias notification) indicating that the load bias of the hosts (computes 30) is large being acquired by the load determination unit 112, calculates the switching candidate of the pair of VMs 3 serving as an ACT/SBY configuration, with reference to the redundant configuration management table 110 (FIG. 4). The switching instruction unit 114 then outputs switching instruction information to the pair of VMs 3 calculated as the target for switching. Hereinafter, a specific description will be given.

First, the VM disposition determination unit 113 of the load leveling apparatus 10 (load leveling function unit 11) receives information (host load bias notification) indicating that the load bias of the hosts (computes 30) was determined to be large from the load determination unit 112 (step S20).

Next, the VM disposition determination unit 113 calculates the average value (hereinafter, "host load average value") of the host load of each host, using information of the host load for a predetermined period of each host (compute 30), and extracts the host having the largest load average value (step S21).

Next, the VM disposition determination unit 113 arranges the loads (hereinafter, "VM load") of the respective VMs 3 in descending order, within the extracted host having the largest host load average value (step S22).

Note that the value of the load acquired closest in time to the calculation time may be used for the VM load of each VM 3 at this time, or the average value of a past predetermined period may be used. Also, a weighted average value may be used.

Next, the VM disposition determination unit 113 sets the constant Y for controlling the number of times that VMs 3 having a high VM load are extracted to 0 (Y=0) (step S23). The VM disposition determination unit 113 then adds 1 to Y (Y=Y+1) (step S24).

Next, the VM disposition determination unit 113 extracts the Yth VM 3 in descending order of VM load from the VMs 3, and, with regard to the VM 3 forming a pair with the extracted VM 3, that is, the extracted VM 3, specifies the pair of VMs 3 serving as an ACT/SBY configuration, with reference to the redundant configuration management table 110 (FIG. 4).

Note that in the case where Y=1, the VM disposition determination unit 113 extracts the VM 3 having the highest VM load among the VMs 3, and specifies the pair of VMs 3. In the case where Y=2, the VM disposition determination unit 113 extracts the VM 3 having the second highest VM load, and specifies the pair of VMs 3. This similarly applied thereafter.

The VM disposition determination unit 113 then calculates the host load in the case of assuming that the Yth specified pair of VMs 3 have been switched and the host load average value for a predetermined period (step S25).

Next, the VM disposition determination unit 113 determines whether has the calculated host load average value is larger than the index value δ of the host load average value set in advance (step S26).

Here, if the host load average value is larger than the index value δ (step S26→Yes), the VM disposition determination unit 113 advances to step S27 and determines whether Y is equal to the number of VMs of the host. Then, if Y is equal to the number of VMs of the host (step S27→Yes), information indicating that load leveling processing cannot be executed (load leveling NG) is notified to the system administrator or the like (step S28). On the other hand, if Y is not equal to the number of YMs (step S27→No), the VM disposition determination unit 113 returns to step S24.

Also, if the host load average value is less than or equal to the index value δ in step S26 (step S26→No), the switching instruction unit 114 selects one pair of VMs 3 from among all the pairs of VMs 3 whose host load average value was calculated in step S25, and outputs a switching instruction for that pair of VMs 3 (step S30). Note that the switching instruction unit 114 repeatedly outputs the switching instruction of step S30 for the number of pairs of VMs 3 whose host load average value was calculated by the VM disposition determination unit 113 in step S25 (steps S29 to S31), and ends the processing.

By adopting this configuration, the load leveling apparatus 10 is able to realize load leveling by switching processing, regardless of application restrictions on the virtualization technique, that is, even in the case where live migration cannot be applied.

(Leveling Technique Setting Processing)

Next, leveling technique setting processing that is executed by the leveling technique setting unit 115 of the load leveling apparatus 10 will be described.

Figure 8:
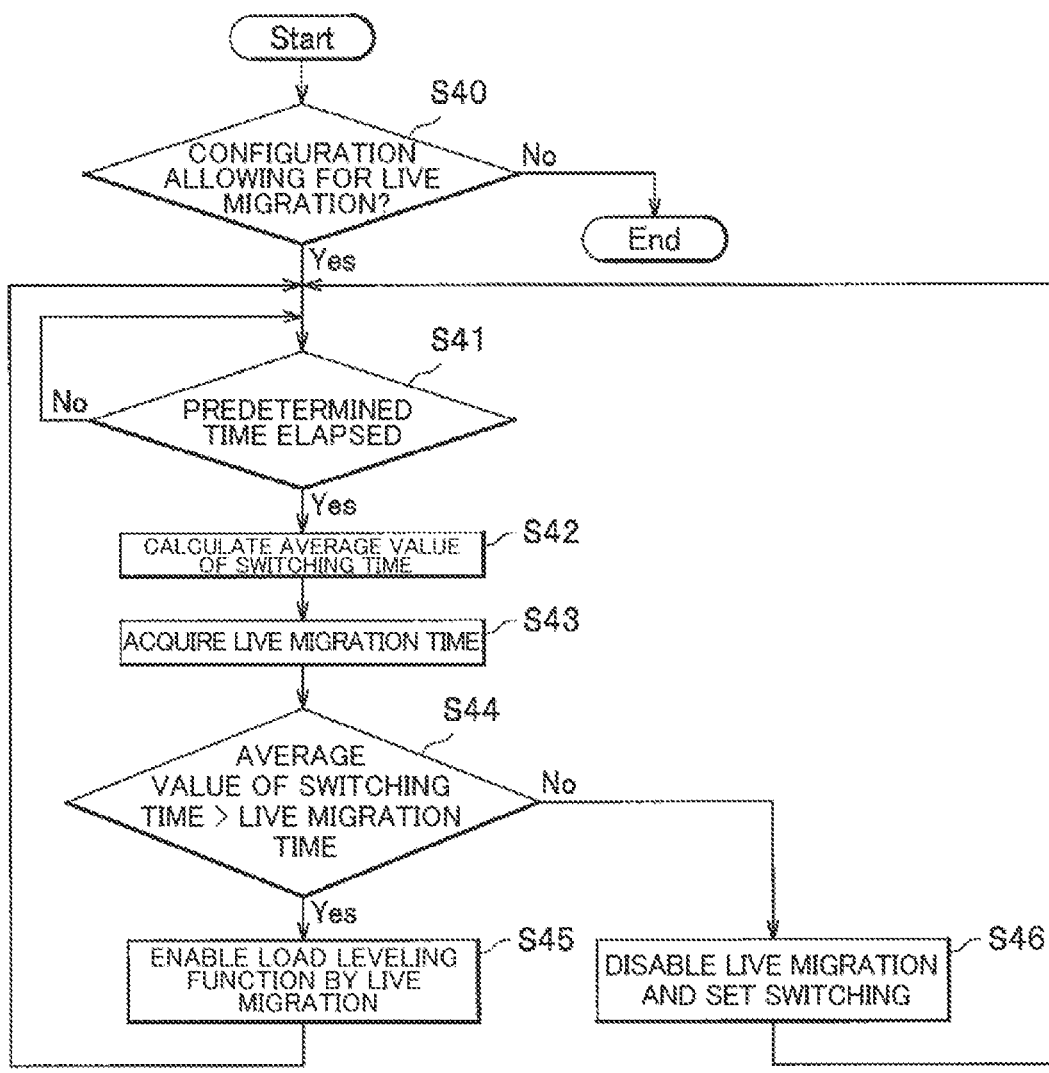
FIG. 8 is a flowchart showing the flow of the leveling technique setting processing that is executed by the load leveling apparatus according to the embodiment.

FIG. 8 is a flowchart showing the flow of leveling technique setting processing that is executed by the load leveling apparatus 10 according to the present embodiment.

In this leveling technique setting processing, first, the leveling technique setting unit 115 determines whether the settings of the compute 30 is a configuration that allows for live migration. The leveling technique setting unit 115 then, in the case where it is determined that live migration is possible, compares the average value of the switching time related to load leveling by switching VMs 3 with the live migration time related to load leveling by live migration, and performs processing for selecting and setting (enabling) the shorter load leveling technique. Note that this leveling technique setting processing is executed at a predetermined time interval independently of the load bias determination processing (FIG. 6) and switching instruction output processing (FIG. 7).

First, the leveling technique setting unit 115 of the load leveling apparatus 10 acquires setting information such as the configuration of the compute 30 that is targeted through inquiry to the virtual infrastructure control apparatus 20, and determines whether the configuration allows for live migration (step S40).

Here, if it is determined that the configuration does not allow for live migration (step S40→No), the leveling technique setting unit 115 ends the processing. In this case, the load leveling apparatus 10 executes load leveling by switching of a pair of VMs 3.

On the other hand, the leveling technique setting unit 115, if it is determined that the configuration allows for live migration (step S40→Yes), advances to the following step S41.

In step S41, the leveling technique setting unit 115 determines whether a predetermined time has elapsed. If the predetermined time has not elapsed (step S41→No), the leveling technique setting unit 115 waits until the predetermined time elapses. On the other hand, if the predetermined time has elapsed (step S41→Yes), the leveling technique setting unit 115 advances to the following step S42.

In step S42, the leveling technique setting unit 115 acquires the switching time of the Active VM and the Standby VM which is measured on the application side, and stores this switching time in the storage unit 12 as the switching time information 150. The leveling technique setting unit 115 then calculates the average value of the switching time in a predetermined time (period).

Next, the leveling technique setting unit 115 acquires the live migration time (step S43). A configuration may be adopted in which information set in advance as a fixed value in the storage unit 12 is acquired as this live migration time, or this live migration time is acquired by measuring the time taken for live migration using an existing load leveling function by live migration.

Next, the leveling technique setting unit 115 compares the average value of the switching time with the live migration time, and determines whether the average value of the switching time is longer (step S44).

Here, if the average value of switching time is longer (step S44→Yes), the leveling technique setting unit 15 sets the leveling technique to live migration. Specifically, the leveling technique setting unit 15 switches the leveling technique from switching to live migration. That is, the leveling technique setting unit 115 outputs instruction information for enabling the load leveling function by live migration of the virtual infrastructure control apparatus 20 (step S45). The leveling technique setting unit 115 then returns to step S41 and continues the processing.

On the other hand, if the average value of the switching time is not longer than (including being the same as) the live migration time (step S44→No), the leveling technique setting unit 15 sets the leveling technique to switching of a pair of VMs 3. Specifically, the leveling technique setting unit 115 determines whether the load leveling function by live migration of the virtual infrastructure control apparatus 20 is enabled, and, if enabled, disables the load leveling function by live migration (step S46). Load leveling processing by switching by the load leveling function unit 11 is thereby set to be executed, and the leveling technique setting unit 115 returns to step S41 and continues the processing.

In this way, the load leveling apparatus 10 compares the average value of the switching time with the live migration time and employs the shorter load leveling technique, and is thus able to minimize the influence on services due to stoppage of applications and the like accompanying load leveling.

As described above, with the load leveling apparatus 10, load leveling method and load leveling program according to the present embodiment in a virtual infrastructure, load leveling between hosts (computes) can be realized regardless of application restrictions on the virtualization technique and by reducing the influence on services. Also, since an existing virtual infrastructure control apparatus 20 (virtual infrastructure) can be utilized without modification, the burden on the system administrator or the like in terms of system modification can also be reduced.

REFERENCE SIGNS LIST

1 Load leveling system
3 VM (virtual machine)
10 Load leveling apparatus
11 Load leveling function unit
12 Storage unit
20 Virtual infrastructure control apparatus
21 Resource delivery control unit
22 Monitoring function unit
23 Storage unit
30 Compute (host)
100 Redundant configuration management repository
110 Redundant configuration management table
111 Redundant configuration management unit
112 Load determination unit
113 VM disposition determination unit
114 Switching instruction unit
115 Leveling technique setting unit
150 Switching time information
160 Live migration time information
200 Resource information repository
210 Resource management table
211 Resource management unit
212 Resource extraction/selection unit
213 Virtual machine control unit
221 Resource monitoring unit
250 Virtual machine image repository

The invention claimed is:

1. A load leveling apparatus performing load leveling of a plurality of Virtual Machines (VMs) implemented on a plurality of computes of various virtual infrastructures to load an application employing an Active/Standby (ACT/SBY) configuration, wherein a redundant configuration of a pair of VMs formed by an Active VM and a Standby VM in the plurality of VMs is implemented, the apparatus comprising:

a storage unit configured to store redundant configuration management information, the redundant configuration management information including an identifier of each VM forming the pair that is associated with the application;

a load determination unit, including one or more processors, configured to acquire load information indicating a load for the compute of each of the VMs, calculate the load of each compute by totaling the load information for every compute in which the VMs are disposed, calculate a standard deviation of the calculated load of each compute, and, in a case where the calculated standard deviation is larger than a predetermined reference standard deviation, determine that there is a large load bias between the computes;

a VM disposition determination unit, including one or more processors, configured to, in a case where it is determined that there is a large load bias between the computes, extract the compute having the highest load among the calculated loads of the computes, select a VM that is disposed in the extracted compute, specify a VM forming a pair with the selected VM with reference to the redundant configuration management information, and determine the selected VM and the specified VM forming the pair as a pair of VMs for performing switching of an Active VM and a Standby VM;

and a switching instruction unit, including one or more processors, configured to output instruction information for switching the determined pair of VMs.

2. The load leveling apparatus according to claim 1, wherein the VM disposition determination unit is configured to, when the compute having the highest load among the calculated loads of the computes is extracted, select a VM in descending order of load among the VMs disposed in the extracted compute, specify a VM forming a pair with the selected VM with reference to the redundant configuration management information, simulate the load of each compute in a case where the selected VM and the specified VM forming the pair are switched, repeatedly select a VM disposed in the extracted compute until the standard deviation of the simulated load of each compute is less than or equal to the predetermined reference standard deviation, and determine a pair of VMs for switching.

3. The load leveling apparatus according to claim 1, wherein
the storage unit is configured to store a live migration time indicating a time taken in a case where a VM disposed in the compute undergoes live migration to another compute, and a switching time indicating a time taken in a case where a VM disposed in the compute underwent switching based on the instruction information in the past; and
the load leveling apparatus further comprises a leveling technique setting unit, including one or more processors, configured to calculate an average value of the switching time for a predetermined period, compare the calculated average value of the switching time with the live migration time, and, if the live migration time is shorter, output setting information for enabling a load leveling function by live migration, and, if the average value of the switching time is shorter, output setting information for disabling the load leveling function by live migration.

4. A load leveling method of a load leveling apparatus performing load leveling of a plurality of Virtual Machines (VMs) implemented on a plurality of computes of various virtual infrastructures to load an application employing an Active/Standby (ACT/SBY) configuration, wherein a redundant configuration of a pair of VMs formed by an Active VM and a Standby VM in the plurality of VMs is implemented, and the load leveling apparatus includes a storage unit that stores redundant configuration management information, the redundant configuration management information including an identifier of each VM forming the pair that is associated with the application, the method comprising:

a step of acquiring load information indicating a load for the compute of each of the VMs, calculating the load of each compute by totaling the load information for every compute in which the VMs are disposed, calculating a standard deviation of the calculated load of each compute, and, in a case where the calculated standard deviation is larger than a predetermined reference standard deviation, determining that there is a large load bias between the computes;

a step of, in a case where it is determined that there is a large load bias between the computes, extracting the compute having the highest load among the calculated loads of the computes, selecting a VM that is disposed in the extracted compute, specifying a VM forming a pair with the selected VM with reference to the redundant configuration management information, and determining the selected VM and the specified VM forming the pair as a pair of VMs for performing switching of an Active VM and a Standby VM; and a step of outputting instruction information for switching the determined pair of VMs.

5. The method according to claim 4, further comprising:
when the compute having the highest load among the calculated loads of the computes is extracted, selecting a VM in descending order of load among the VMs disposed in the extracted compute, specifying a VM forming a pair with the selected VM with reference to the redundant configuration management information, simulating the load of each compute in a case where the selected VM and the specified VM forming the pair are switched, repeatedly selecting a VM disposed in the extracted compute until the standard deviation of the simulated load of each compute is less than or equal to the predetermined reference standard deviation, and determining a pair of VMs for switching.

6. The method of claim 4, wherein:
the storage unit stores live migration time indicating a time taken in a case where a VM disposed in the compute undergoes live migration to another compute, and a switching time indicating a time taken in a case where a VM disposed in the compute underwent switching based on the instruction information in the past;

and the method further comprises:
calculating an average value of the switching time for a predetermined period;
comparing the calculated average value of the switching time with the live migration time;
if the live migration time is shorter, outputting setting information for enabling a load leveling function by live migration; and
if the average value of the switching time is shorter, outputting setting information for disabling the load leveling function by live migration.

7. A non-transitory computer readable medium storing a load leveling program for causing a computer to function as the load leveling apparatus performing load leveling of a plurality of Virtual Machines (VMs) implemented on a plurality of computes of various virtual infrastructures to load an application employing an Active/Standby (ACT/SBY) configuration, wherein a redundant configuration of a pair of VMs formed by an Active VM and a Standby VM in the plurality of VMs is implemented, the apparatus comprising:

a storage unit configured to store redundant configuration management information, the redundant configuration management information including an identifier of each VM forming the pair that is associated with the application;

a load determination unit, including one or more processors, configured to acquire load information indicating a load for the compute of each of the VMs, calculate the load of each compute by totaling the load information for every compute in which the VMs are disposed, calculate a standard deviation of the calculated load of each compute, and, in a case where the calculated standard deviation is larger than a predetermined reference standard deviation, determine that there is a large load bias between the computes;

a VM disposition determination unit, including one or more processors, configured to, in a case where it is determined that there is a large load bias between the computes, extract the compute having the highest load among the calculated loads of the computes, select a VM that is disposed in the extracted compute, specify a VM forming a pair with the selected VM with reference to the redundant configuration management information, and determine the selected VM and the specified VM forming the pair as a pair of VMs for performing switching of an Active VM and a Standby VM; and a switching instruction unit, including one or more processors, configured to output instruction information for switching the determined pair of VMs.

8. The non-transitory computer readable medium according to claim 7, wherein the load leveling program stored in the non-transitory computer readable medium further causes the computer to perform: when the compute having the highest load among the calculated loads of the computes is extracted, selecting a VM in descending order of load among the VMs disposed in the extracted compute, specifying a VM forming a pair with the selected VM with reference to the redundant configuration management information, simulating the load of each compute in a case where the selected VM and the specified VM forming the pair are switched, repeatedly selecting a VM disposed in the extracted compute until the standard deviation of the simulated load of each compute is less than or equal to the predetermined reference standard deviation, and determining a pair of VMs for switching.

9. The non-transitory computer readable medium according to claim 7, wherein the load leveling program stored in the non-transitory computer readable medium further causes the computer to perform:
storing, in the storage unit, live migration time indicating a time taken in a case where a VM disposed in the compute undergoes live migration to another compute, and a switching time indicating a time taken in a case where a VM disposed in the compute underwent switching based on the instruction information in the past;
calculating an average value of the switching time for a predetermined period;
comparing the calculated average value of the switching time with the live migration time;

if the live migration time is shorter, outputting setting information for enabling a load leveling function by live migration; and
if the average value of the switching time is shorter, outputting setting information for disabling the load leveling function by live migration.

* * * * *